United States Patent
Potasek et al.

(10) Patent No.: US 11,662,263 B2
(45) Date of Patent: May 30, 2023

(54) PRESSURE SENSOR FOR PREVENTING FLUID JETTING

(71) Applicant: Rosemount Aerospace Inc., Burnsville, MN (US)

(72) Inventors: David P. Potasek, Lakeville, MN (US); Ulf J. Jonsson, South Windsor, CT (US)

(73) Assignee: ROSEMOUNT AEROSPACE INC., Burnsville, MN (US)

( * ) Notice: Subject to any disclaimer, the term of this patent is extended or adjusted under 35 U.S.C. 154(b) by 126 days.

(21) Appl. No.: 17/217,254

(22) Filed: Mar. 30, 2021

(65) Prior Publication Data
US 2022/0316971 A1 Oct. 6, 2022

(51) Int. Cl.
G01L 9/00 (2006.01)
G01L 19/00 (2006.01)
G01L 19/06 (2006.01)

(52) U.S. Cl.
CPC ........ *G01L 9/0052* (2013.01); *G01L 19/0038* (2013.01); *G01L 19/06* (2013.01)

(58) Field of Classification Search
None
See application file for complete search history.

(56) References Cited

U.S. PATENT DOCUMENTS

| | | | |
|---|---|---|---|
| 5,447,073 A * | 9/1995 | Kalinoski | G01L 19/143 73/861.24 |
| 6,050,145 A * | 4/2000 | Olson | G01L 19/147 73/756 |
| 9,651,440 B2 * | 5/2017 | Montoya | G01L 19/143 |
| 10,302,516 B2 * | 5/2019 | DeRosa | G01L 19/0609 |
| 2009/0078054 A1 * | 3/2009 | Romo | G01L 13/026 73/717 |
| 2012/0090397 A1 * | 4/2012 | Angus | G01L 19/0609 73/700 |
| 2020/0348200 A1 * | 11/2020 | DeRosa | G01L 19/0636 |

FOREIGN PATENT DOCUMENTS

| | | |
|---|---|---|
| CN | 111006810 A | 4/2020 |
| EP | 0824675 A1 | 2/1998 |
| EP | 2442083 A1 | 4/2012 |
| WO | 9634264 A1 | 10/1996 |

OTHER PUBLICATIONS

Partial Extended European Search Report for European Patent Application No. 22165418.9, dated Sep. 1, 2022, 13 pages.
Extended European Search Report for European Patent Application No. 22165418.9, dated Dec. 5, 2022, 12 pages.

* cited by examiner

*Primary Examiner* — Lisa M Caputo
*Assistant Examiner* — Nigel H Plumb
(74) *Attorney, Agent, or Firm* — Kinney & Lange, P.A.

(57) ABSTRACT

A pressure sensor includes a housing, an isolator positioned at a first end of the housing, and a first cavity formed between the first end of the housing and the isolator. The pressure sensor further includes a second cavity formed in the housing and a channel with a first end fluidly connected to the first cavity and a second end fluidly coupled to the second cavity. A pressure sensor chip is positioned in the second cavity and includes a first diaphragm positioned at a top side of the pressure sensor chip laterally outwards from the second end of the channel to prevent a fluid from jetting onto the first diaphragm.

20 Claims, 3 Drawing Sheets

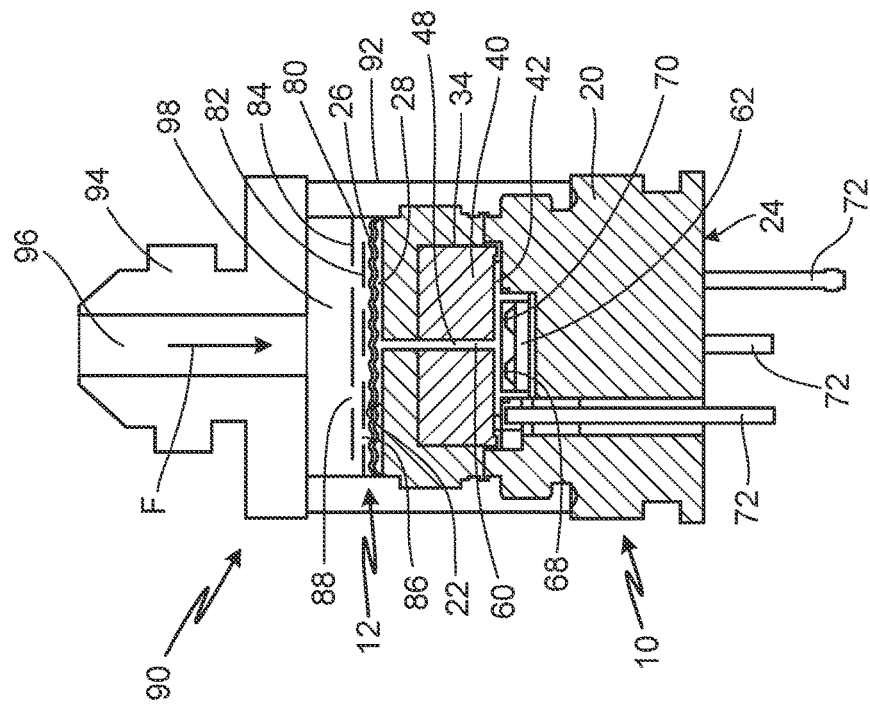
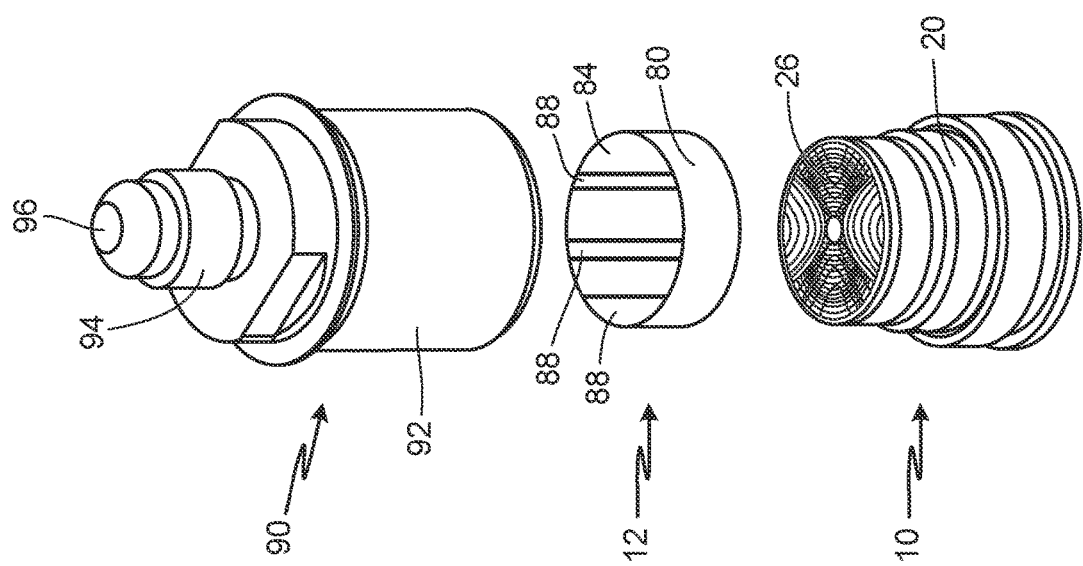

PRESSURE SENSOR FOR PREVENTING FLUID JETTING

BACKGROUND

The present disclosure relates to pressure sensors, and in particular, to pressure sensors for use in applications where the fluid pressure fluctuates at high frequency.

A pressure sensor is configured to measure the pressure of a fluid. Pressure sensors can be absolute pressure sensors that measure a pressure of a first fluid compared to a reference pressure (typically a vacuum). Pressure sensors can also be differential pressure sensors that measure a difference in pressure between a first fluid and a second fluid. Pressure sensors can measure pressure in a variety of ways. For example, a pressure sensor can have one or more diaphragms that deform based on the pressure of a first fluid and/or a second fluid and one or more piezoresistive strain gauge sensors on the diaphragms can measure the strain in the diaphragms caused by the deformation of the diaphragms.

Pressure sensors sometimes need to operate in harsh environments. One such environment is when high frequency pressure ripples are occurring over the pressure of interest. In some applications, the amplitude of the pressure ripple can approach that of the mean pressure of the pressure sensor. If the pressure ripple frequency coincides with resonant frequencies of the pressure sensor, it is possible that the amplitude of the pressure ripple will be amplified. The amplitude added to the mean pressure may exceed the capability of the pressure sensor, which can result in failures. Further, the pressure sensor is typically not linear at high frequencies, either due to geometric effects or from cases where the amplitude exceeds the mean pressure, which can result in cavitation. This can result in the high frequency components not cancelling out and can cause an erroneous output or offset on the true mean pressure. The acoustic resonances of fluids, Helmholtz resonances, and mechanical resonances of components in the pressure sensors and mountings for the pressure sensors need to be accounted for.

SUMMARY

A pressure sensor includes a housing, an isolator positioned at a first end of the housing, and a first cavity formed between the first end of the housing and the isolator. The pressure sensor further includes a second cavity formed in the housing and a channel with a first end fluidly connected to the first cavity and a second end fluidly coupled to the second cavity. A pressure sensor chip is positioned in the second cavity and includes a first diaphragm positioned at a top side of the pressure sensor chip laterally outwards from the second end of the channel.

A pressure sensor includes a housing, an isolator positioned at a first end of the housing, and a first cavity formed between the first end of the housing and the isolator. The pressure sensor further includes a second cavity formed in the housing, and a channel with a first end fluidly connected to the first cavity and a second end fluidly coupled to the second cavity. A pressure sensor chip is positioned in the second cavity. A baffle arrangement is positioned over a top side of the isolator, wherein the baffle arrangement is configured to prevent a fluid from jetting onto the isolator.

A system includes a pressure sensor, a baffle arrangement, and a pressure fitting. The pressure sensor includes a housing, an isolator positioned at a first end of the housing, and a first cavity formed between the first end of the housing and the isolator. The pressure sensor further includes a second cavity formed in the housing, and a channel with a first end fluidly connected to the first cavity and a second end fluidly coupled to the second cavity. A pressure sensor chip is positioned in the second cavity. The baffle arrangement is positioned over a top side of the isolator. The pressure fitting is positioned over and connected to the housing of the pressure sensor, wherein the baffle arrangement is positioned in a cavity formed between the pressure fitting and the pressure sensor.

BRIEF DESCRIPTION OF THE DRAWINGS

FIG. 2A is an exploded perspective view of a pressure sensor, a baffle arrangement, and a first embodiment of a pressure fitting.

FIG. 2B is cross-sectional view of the pressure sensor, the baffle arrangement, and the first embodiment of the pressure fitting.

DETAILED DESCRIPTION

Figure 1:
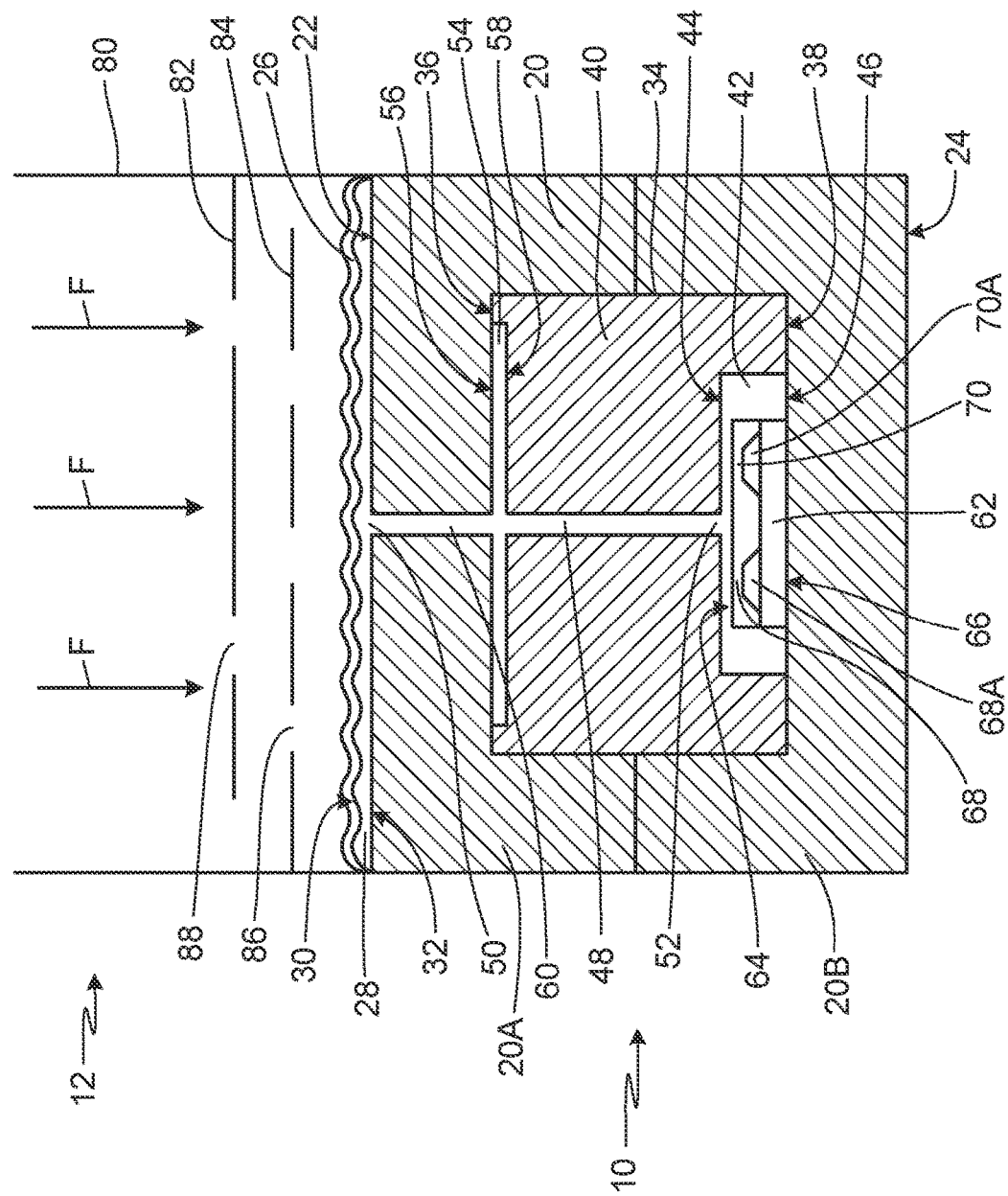
FIG. 1 is a schematic cross-sectional view of a pressure sensor and a baffle arrangement.

FIG. 1 is a schematic cross-sectional view of pressure sensor 10 and baffle arrangement 12. FIG. 1 shows pressure sensor 10 and baffle arrangement 12. Pressure sensor 10 includes housing 20 (including first end 22 and second end 24), isolator 26, first cavity 28 (including first end 30 and second end 32), chamber 34 (including first end 36 and second end 38), filler material 40, second cavity 42 (including first end 44 and second end 46), channel 48 (including first end 50 and second end 52), third cavity 54 (including first end 56 and second end 58), pressure transfer fluid 60, pressure sensor chip 62 (including first end 64 and second end 66), first diaphragm 68, chamber 68A, second diaphragm 70, and chamber 70A. Baffle arrangement 12 includes housing 80, first screen 82, second screen 84, openings 86, and openings 88. FIG. 1 also shows fluid F.

Pressure sensor 10 and baffle arrangement 12 are shown in FIG. 1. In a first embodiment, pressure sensor 10 can be used in an oil or fuel pump. Pressure sensor 10 can also be used in any suitable application in alternate embodiments. Pressure sensor 10 includes housing 20 that forms a body of pressure sensor 10. Housing 20 has first end 22 and second end 24 opposite first end 22. Housing 20 is shown schematically in FIG. 1 and can have any suitable shape. Housing 20 can be formed as two housing portions 20A and 20B that are joined together, allowing access to an interior of housing 20 before assembly. Isolator 26 is positioned on first end 22 of housing 20 and forms a seal with housing 20. Isolator 26 has a corrugated disc shape and is made out of a metallic material, for example stainless steel. First cavity 28 is formed between isolator 26 and first end 22 of housing 20. First cavity 28 has a generally convex disc shape with first end 30 and second end 32 opposite of first end 30. Isolator 26 defines first end 30 of first cavity 28, and first end 22 of housing 20 defines second end 32 of first cavity 28.

Chamber 34 is formed in a center portion of housing 20. Chamber 34 has a cylindrical shape with first end 36 and second end 38 opposite first end 36. Chamber 34 is mostly filled with filler material 40. Filler material 40 can be any suitable material, specifically a material with a low coefficient of linear thermal expansion (CTE). One example of a material that can be used as filler material 40 can be a glass filled thermoplastic polymer, such as a glass filled polyetherimide (PEI), commonly known as Ultem®.

Second cavity 42 is positioned at second end 38 of chamber 34. Second cavity 42 has first end 44 and second end 46 opposite of first end 44. Housing 20 defines second end 46 of second cavity 42. First end 44 of second cavity 42 is defined by filler material 40. Channel 48 extends through housing 20 and chamber 34 from first cavity 28 to second cavity 42. Channel 48 has first end 50 and second end 52 opposite of first end 50. Channel 48 has first end 50 positioned at and fluidly coupled to first cavity 28, and second end 52 positioned at and fluidly coupled to second cavity 42.

Third cavity 54 is positioned at first end 36 of chamber 34. Third cavity 54 has a cylindrical shape and has first end 56 and second end 58 opposite of first end 56. Housing 20 defines first end 56 of third cavity 54. Second end 58 of third cavity 54 is defined by filler material 40. Channel 48 extends through a center of third cavity 54. In alternate embodiments, pressure sensor 10 does not include third cavity 54.

Pressure transfer fluid 60 is positioned in and fills first cavity 28, second cavity 42, channel 48, and third cavity 54. Pressure transfer fluid 60 can be any fluid that is suitable for being used in pressure sensor 10, specifically an inert fluid having a viscosity between 5 and 10 centistokes. One example of a material that can be used as pressure transfer fluid 60 can be a silicone-based fluid.

Pressure sensor chip 62 is positioned in second cavity 42. Pressure sensor chip 62 includes first end 64 and second end 66 opposite of first end 64. Second end 66 of pressure sensor chip 62 is mounted to housing 20. Pressure sensor chip 62 is positioned in second cavity 42 so that pressure transfer fluid 60 surrounds first end 64 and side walls of pressure sensor chip 62. In the embodiment shown in FIG. 1, pressure sensor chip 62 is a MEMS die. First diaphragm 68 and second diaphragm 70 are positioned in pressure sensor chip 62 adjacent first end 64 of pressure sensor chip 62. Chambers 68A and 70A are positioned underneath first diaphragm 68 and second diaphragm 70, respectively, in pressure sensor chip 62. Chambers 68A and 70A include a fluid, typically an inert fluid, at a set reference pressure, typically near or at vacuum. First diaphragm 68 and second diaphragm 70 can deflect due to a difference in pressure between pressure transfer fluid 60 and the reference pressure of the fluid in chambers 68A and 70A in pressure sensor chip 62. Pressure sensor chip 62 includes one or more piezoresistor strain gauge sensors that will measure a strain of first diaphragm 68 and second diaphragm 70 due to the deflection of first diaphragm 68 and second diaphragm 70. Pressure sensor chip 62 can also include electrical traces and bond pads electrically connected to the piezoresistor strain gauge sensors. Pressure sensor 10 can include electrical connections (not shown in FIG. 1), for example feedthrough pins and wire bonds, extending from second cavity 42 through second end 24 of housing 20 to electrically couple pressure sensor chip 62 to a circuit board or other electrical device outside of pressure sensor 10.

Fluid F is a fluid of which pressure sensor 10 is configured to measure a pressure. Fluid F is represented by arrows F in FIG. 1. Fluid F flows towards isolator 26 of pressures sensor 10. The force of fluid F can cause isolator 26 to deflect inwards to compress pressure transfer fluid 60. The compression of pressure transfer fluid 60 can then cause first diaphragm 68 and second diaphragm 70 to deflect. The deflection of first diaphragm 68 and second diaphragm 70 can be sensed in pressure sensor chip 62 and the sensed signal can be used to determine the pressure of fluid F.

Pressure sensor 10 needs to operate in harsh environments when high frequency pressure ripples occur over the pressure of interest. If the pressure ripple frequency coincides with resonant frequencies of pressure sensor 10, it is possible that the amplitude of the pressure ripple will be amplified. If the amplitude and the mean pressure of pressure sensor 10 exceed the capability of pressure sensor 10, it can result in failure of pressure sensor 10. To prevent failure, pressure sensor 10 is designed with the acoustic resonances, Helmholtz resonances, and mechanical resonances of the components of pressure sensor 10 in mind.

The acoustic velocity of a fluid (which can be derived from its bulk modulus and density) as well as the geometry and stiffness of pressure sensor 10 and the package it is installed in need to be considered to mitigate the effects of pressure ripple. An analytical solution to acoustic resonance has been found by Hermann von Helmholtz and gives insight into the primary factors that determine resonance. The Helmholtz model is represented by the following equation:

$$fn = \frac{\phi_{hole}}{4} \sqrt{\frac{K_{bulk}}{\pi \rho L V}} \quad \text{(Equation 1)}$$

where: $\phi_{hole}$=diameter of a hole;
L=length of the hole;
V=volume of reservoir;
ρ=density of fluid; and
$K_{bulk}$=bulk modulus of fluid.

One of the main parameters that can be used to adjust the resonance frequency of a system is the diameter of a hole. In pressure sensor 10, the hole is represented by channel 48, thus adjustments to a diameter of channel 48 can adjust the resonance frequency of pressure sensor 10. Specifically, the diameter of channel 48 is sized such that any resonance modes of pressure sensor 10 are moved away from any critical frequencies, such as a pumping frequency. The length of the hole, or the length of channel 48, can also be adjusted to adjust the resonance frequency of pressure sensor 10.

Further, channel 48 is positioned at a null point of the primary resonance mode of isolator 26 of pressure sensor 10. The null point of isolator 26 of pressure sensor 10 can be determined using finite element analysis. In the embodiment of pressure sensor 10, isolator 26 has a circular symmetric shape with uniform thickness, so the null point of the primary resonance mode of isolator 26 of pressure sensor 10 is the center of pressure sensor 10. Thus, channel 48 is positioned at a center of pressure sensor 10. In alternate embodiments, the null point of the primary resonance mode of isolator 26 can be in a different location based on the geometry of isolator 26. For example, if isolator 26 were thicker on one side it would shift the null point of the primary resonance mode of isolator 26.

First diaphragm 68 and second diaphragm 70 of pressure sensor chip 62 are also positioned laterally outward from channel 48. As pressure transfer fluid 60 is compressed and pressurized, jetting of a pressure wave of pressure transfer fluid 60 may occur down channel 48. The jetting of pressure transfer fluid 60 can cause erroneous readings if a diaphragm of pressure sensor chip 62 is positioned at second end 52 of channel 48 and pressure transfer fluid 60 is jetted on the diaphragm. The jetting action of pressure transfer fluid 60 tends to rectify in the signal sensed by pressure sensor chip 62, as a pushing pressure can be higher than a pulling pressure. This tends to create a positive bias of the sensed pressure due to the jet velocity of pressure transfer fluid 60 creating a higher total pressure during the filling phase than during the draining phase. Rectification errors change the true average pressure of interest. First diaphragm 68 and second diaphragm 70 of pressure sensor chip 62 are positioned laterally outward from second end 52 of channel 48 to prevent pressure transfer fluid 60 from jetting onto first diaphragm 68 and second diaphragm 70.

Further, baffle arrangement 12 can be positioned over pressure sensor 10 to prevent incoming fluid F from jetting onto isolator 26 of pressure sensor 10. Baffle arrangement 12 includes housing 80 that is attached to housing 20 of pressure sensor 10. First screen 82 and second screen 84 are held within housing 80 of baffle arrangement 12 and are positioned over isolator 26 of pressure sensor 10. First screen 82 includes openings 86, and second screen 84 includes openings 88. Openings 86 of first screen 82 are offset from the openings 88 of second screen 84. First screen 82 and second screen 84 prevent incoming fluid F from jetting onto isolator 26 and breaks up any standing waves, as incoming fluid F has to move through openings 86 of first screen 82 and openings 88 of second screen 84 before reaching isolator 26 of pressure sensor 10. This prevents direct excitation of isolator modes from large pressure ripples. In alternate embodiments, baffle arrangement 12 can include one or more screens or plates with any pattern of holes (symmetric or asymmetric) or one or more meshes. Baffle arrangement 12 ensures that the pressure waves of incoming fluid F are broken up and not coherent.

FIG. 2A is an exploded perspective view of pressure sensor 10, baffle arrangement 12, and pressure fitting 90. FIG. 2B is cross-sectional view of pressure sensor 10, baffle arrangement 12, and pressure fitting 90. FIGS. 2A-2B shows pressure sensor 10 and baffle arrangement 12. Pressure sensor 10 includes housing 20 (including first end 22 and second end 24), isolator 26, first cavity 28, chamber 34, filler material 40, second cavity 42, channel 48, pressure transfer fluid 60, pressure sensor chip 62, first diaphragm 68, second diaphragm 70, and electrical connections 72. Baffle arrangement 12 includes housing 80, first screen 82, second screen 84, openings 86, and openings 88. FIGS. 2A-2B further show pressure fitting 90 including housing 92, fluid connector 94, bore 96, and cavity 98. FIGS. 2A-2B also show fluid F.

Pressure sensor 10 shown in FIGS. 2A-2B has the same general structure and design as pressure sensor 10 shown in FIG. 1 above. However, pressure sensor 10 does not include third cavity 54. Housing 20 is also shown as having a generally cylindrical shape with grooves and ridges on an outer surface of housing 20. Pressure sensor 10 also includes electrical connections 72 that extend from second cavity 42 through housing 20 and out of second end 24 of housing 20. Electrical connections 72 are electrically connected to pressure sensor chip 62 in second cavity 42. Electrical connections 72 are configured to be electrically connected to a circuit board or other electrical device outside of housing 20 of pressure sensor 10 to transfer a signal from pressure sensor chip 62 in pressure sensor 10 to the circuit board or other electrical device. Baffle arrangement 12 shown in FIGS. 2A-2B has the same general structure and design as baffle arrangement 10 shown in FIG. 1 above.

As shown in FIGS. 2A-2B, pressure sensor 10 is connected to and partially positioned in pressure fitting 90, and baffle arrangement 12 is positioned within pressure fitting 90. Pressure fitting 90 is one example of a pressure fitting in which pressure sensor 10 and baffle arrangement 12 can be positioned. Pressure fitting 90 includes housing 92 that has a cylindrical shape and is positioned around and connected to housing 20 of pressure sensor 20. Fluid connector 94 is connected to a first end of housing 92 of pressure fitting 90. Bore 96 extends through fluid connector 94 and is fluidly coupled to cavity 98, which is formed between housing 92 and pressure sensor 10. Baffle arrangement 12 is positioned on first end 22 of housing 20 in cavity 98. Pressure fitting 90 can have any suitable shape and size in alternate embodiments.

Fluid connector 94 can be configured to be connected to a tube, typically through a matting fitting, through which fluid F can flow. Further, pressure sensor 10 can be directly mounted in a pump manifold through which fluid F can flow. Fluid F is show with arrow F in FIGS. 2A-2B. Fluid F flows through bore 96 of fluid connector 94 into cavity 98. Fluid F then flows through first screen 82 and second screen 84 of baffle arrangement 12 onto isolator 26 of pressure sensor 10. Baffle arrangement 12 prevents fluid F from jetting onto isolator 26 and breaks up the pressure waves of incoming fluid F.

Figure 3:
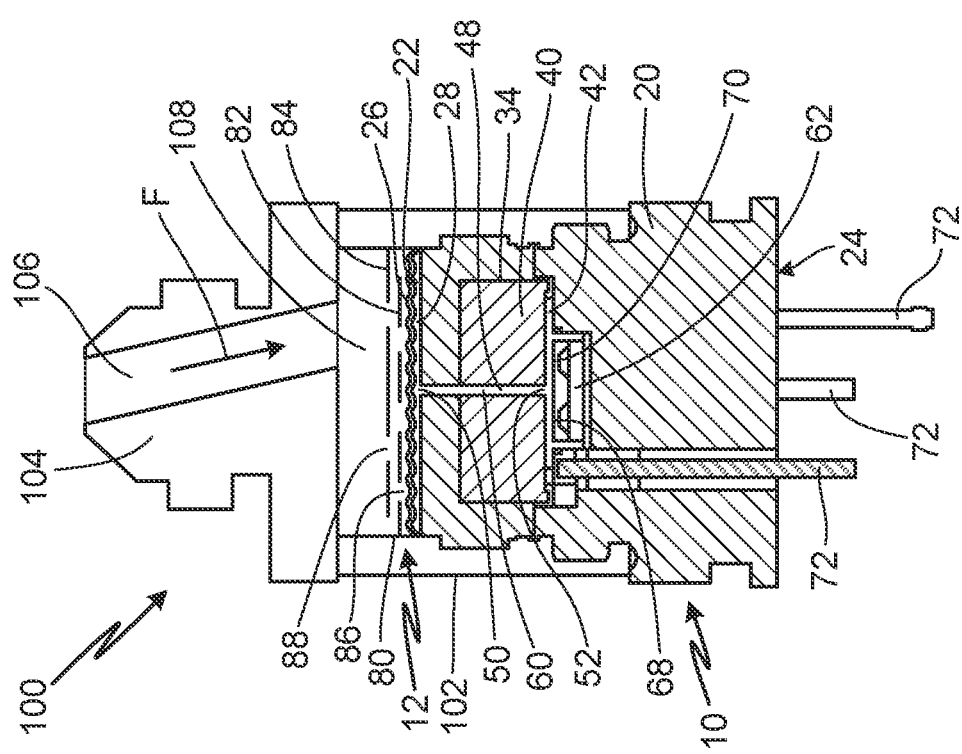
FIG. 3 is a cross-sectional view of the pressure sensor, the baffle arrangement, and a second embodiment of the pressure fitting.

FIG. 3 is a cross-sectional view of pressure sensor 10, baffle arrangement 12, and pressure fitting 100. FIG. 3 shows pressure sensor 10 and baffle arrangement 12. Pressure sensor 10 includes housing 20 (including first end 22 and second end 24), isolator 26, first cavity 28, chamber 34, filler material 40, second cavity 42, channel 48 (including first end 50 and second end 52), pressure transfer fluid 60, pressure sensor chip 62, first diaphragm 68, second diaphragm 70, and electrical connections 72. Baffle arrangement 12 includes housing 80, first screen 82, second screen 84, openings 86, and openings 88. FIG. 3 further shows pressure fitting 100 including housing 102, fluid connector 104, bore 106, and cavity 108. FIG. 3 also shows fluid F.

Pressure sensor 10 shown in FIG. 3 has the same general structure and design as pressure sensor 10 shown in FIG. 1 above. Pressure sensor 10 does not include third cavity 54. Housing 20 is also shown as having a generally cylindrical shape with grooves and ridges on an outer surface of housing 20. Pressure sensor 10 also includes electrical connections 72 that extend from second cavity 42 through housing 20 and out of second end 24 of housing 20. Electrical connections 72 are electrically connected to pressure sensor chip 62 in second cavity 42. Electrical connections 72 are configured to be electrically connected to a circuit board or other electrical device outside of housing 20 of pressure sensor 10 to transfer a signal from pressure sensor chip 62 in pressure sensor 10 to the circuit board or other electrical device. Baffle arrangement 12 shown in FIG. 3 has the same general structure and design as baffle arrangement 10 shown in FIG. 1 above.

As shown in FIG. 3, pressure sensor 10 is connected to and partially positioned in pressure fitting 100 and baffle arrangement 12 is positioned within pressure fitting 100. Pressure fitting 100 has the same general structure and design as pressure fitting 90 shown in FIGS. 2A-2B above. However, bore 106 of pressure fitting 100 extends through fluid connector 104 at an angle with respect to a central axis of fluid connector 104. Bore 106 extends through fluid connector 104 at an angle so that fluid F flowing through fluid connector 104 does not jet onto isolator 26 of pressure sensor 10, and more specifically prevents fluid F from jetting onto isolator 26 over first end 50 of channel 48. This prevents pressure ripples from moving down channel 48 onto pressure sensor chip 62.

FIG. 3 further shows baffle arrangement 12 positioned between bore 106 of pressure fitting 100 and isolator 26 to prevent fluid F from jetting onto isolator 26. In alternate embodiments, baffle arrangement 12 is not positioned between bore 106 of pressure fitting 100 and isolator 26.

Discussion of Possible Embodiments

The following are non-exclusive descriptions of possible embodiments of the present invention.

A pressure sensor includes a housing, an isolator positioned at a first end of the housing, and a first cavity formed between the first end of the housing and the isolator. The pressure sensor further includes a second cavity formed in the housing and a channel with a first end fluidly connected to the first cavity and a second end fluidly coupled to the second cavity. A pressure sensor chip is positioned in the second cavity and includes a first diaphragm positioned at a top side of the pressure sensor chip laterally outwards from the second end of the channel.

The pressure sensor of the preceding paragraph can optionally include, additionally and/or alternatively, any one or more of the following features, configurations and/or additional components:

Wherein the first diaphragm is positioned laterally outwards to a first side of the second end of the channel, and wherein the pressure sensor chip further includes a second diaphragm positioned laterally outwards to a second side of the second end of the channel.

Wherein the channel is aligned with a null point of a primary resonance mode of the isolator.

Wherein a diameter and a length of the channel can be adjusted to adjust a resonance frequency of the pressure sensor.

The pressure sensor further includes a baffle arrangement positioned over a top side of the isolator.

Wherein the baffle arrangement is configured to prevent a fluid from jetting onto the isolator.

Wherein the baffle arrangement includes a first screen having a plurality of openings positioned over the isolator, and a second screen having a plurality of openings positioned over the first screen, wherein the plurality of openings of the first screen are offset from the plurality of openings of the second screen.

The pressure sensor further includes a pressure transfer fluid in the first cavity, the channel, and the second cavity.

A pressure sensor includes a housing, an isolator positioned at a first end of the housing, and a first cavity formed between the first end of the housing and the isolator. The pressure sensor further includes a second cavity formed in the housing, and a channel with a first end fluidly connected to the first cavity and a second end fluidly coupled to the second cavity. A pressure sensor chip is positioned in the second cavity. A baffle arrangement is positioned over a top side of the isolator, wherein the baffle arrangement is configured to prevent a fluid from jetting onto the isolator.

The pressure sensor of the preceding paragraph can optionally include, additionally and/or alternatively, any one or more of the following features, configurations and/or additional components:

Wherein the baffle arrangement includes a first screen having a plurality of openings positioned over the isolator, and a second screen having a plurality of openings positioned over the first screen, wherein the plurality of openings of the first screen are offset from the plurality of openings of the second screen.

Wherein the pressure sensor chip includes a first diaphragm positioned on a top side of the pressure sensor chip laterally outwards from the second end of the channel.

Wherein the channel is aligned with a null point of a primary resonance mode of the isolator.

Wherein a diameter and a length of the channel can be adjusted to adjust a resonance frequency of the pressure sensor.

A system includes a pressure sensor, a baffle arrangement, and a pressure fitting. The pressure sensor includes a housing, an isolator positioned at a first end of the housing, and a first cavity formed between the first end of the housing and the isolator. The pressure sensor further includes a second cavity formed in the housing, and a channel with a first end fluidly connected to the first cavity and a second end fluidly coupled to the second cavity. A pressure sensor chip is positioned in the second cavity. The baffle arrangement is positioned over a top side of the isolator. The pressure fitting is positioned over and connected to the housing of the pressure sensor, wherein the baffle arrangement is positioned in a cavity formed between the pressure fitting and the pressure sensor.

The system of the preceding paragraph can optionally include, additionally and/or alternatively, any one or more of the following features, configurations and/or additional components:

Wherein the pressure fitting further includes a housing that is connected to the housing of the pressure sensor, a fluid connector at a first end of the housing, and a bore extending through the fluid connector and fluidly coupled to the cavity between the pressure fitting and the pressure sensor.

Wherein the bore extends through the fluid connector at an angle with respect to a central axis of the fluid connector.

Wherein the pressure sensor chip further includes a first diaphragm positioned on a top side of the pressure sensor chip laterally outwards from the second end of the channel.

Wherein the channel is aligned with a null point of a primary resonance mode of the isolator.

Wherein the baffle arrangement is configured to prevent a fluid from jetting onto the isolator.

Wherein the baffle arrangement includes a first screen having a plurality of openings positioned over the isolator, and a second screen having a plurality of openings positioned over the first screen, wherein the plurality of openings of the first screen are offset from the plurality of openings of the second screen.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:
1. A pressure sensor comprising:
a housing;
an isolator positioned at a first end of the housing;
a first cavity formed between the first end of the housing and the isolator;
a second cavity formed in the housing;

a channel with a first end fluidly connected to the first cavity and a second end fluidly coupled to the second cavity; and a pressure sensor chip positioned in the second cavity, the pressure sensor chip comprising:

a first diaphragm positioned at a top side of the pressure sensor chip laterally outwards from the second end of the channel to prevent a fluid from jetting onto the first diaphragm.

2. The pressure sensor of claim 1, wherein the first diaphragm is positioned laterally outwards to a first side of the second end of the channel, and wherein the pressure sensor chip further comprises:

a second diaphragm positioned laterally outwards to a second side of the second end of the channel.

3. The pressure sensor of claim 1, wherein the channel is aligned with a null point of a primary resonance mode of the isolator.

4. The pressure sensor of claim 1, wherein a diameter and a length of the channel can be adjusted to adjust a resonance frequency of the pressure sensor.

5. The pressure sensor of claim 1, and further comprising:
a baffle arrangement positioned over a top side of the isolator.

6. The pressure sensor of claim 5, wherein the baffle arrangement is configured to prevent a fluid from jetting onto the isolator.

7. The pressure sensor of claim 5, wherein the baffle arrangement comprises:

a first screen having a plurality of openings positioned over the isolator; and a second screen having a plurality of openings positioned over the first screen;

wherein the plurality of openings of the first screen are offset from the plurality of openings of the second screen.

8. The pressure sensor of claim 1, and further comprising:
a pressure transfer fluid in the first cavity, the channel, and the second cavity.

9. A pressure sensor comprising:
a housing;
an isolator positioned at a first end of the housing;
a first cavity formed between the first end of the housing and the isolator;
a second cavity formed in the housing;
a channel with a first end fluidly connected to the first cavity and a second end fluidly coupled to the second cavity;
a pressure sensor chip positioned in the second cavity; and
a baffle arrangement positioned over a top side of the isolator, wherein the baffle arrangement is configured to prevent a fluid from jetting onto the isolator.

10. The pressure sensor of claim 9, wherein the baffle arrangement comprises:

a first screen having a plurality of openings positioned over the isolator; and a second screen having a plurality of openings positioned over the first screen;

wherein the plurality of openings of the first screen are offset from the plurality of openings of the second screen.

11. The pressure sensor of claim 9, wherein the pressure sensor chip comprises:

a first diaphragm positioned at a top side of the pressure sensor chip laterally outwards from the second end of the channel.

12. The pressure sensor of claim 9, wherein the channel is aligned with a null point of a primary resonance mode of the isolator.

13. The pressure sensor of claim 9, wherein a diameter and a length of the channel can be adjusted to adjust a resonance frequency of the pressure sensor.

14. A system comprising:
a pressure sensor comprising:
a housing;
an isolator positioned at a first end of the housing;
a first cavity formed between the first end of the housing and the isolator;
a second cavity formed in the housing;
a channel with a first end fluidly connected to the first cavity and a second end fluidly coupled to the second cavity; and
a pressure sensor chip positioned in the second cavity;
a baffle arrangement positioned over a top side of the isolator; and
a pressure fitting positioned over and connected to the housing of the pressure sensor, wherein the baffle arrangement is positioned in a cavity formed between the pressure fitting and the pressure sensor.

15. The system of claim 14, wherein the pressure fitting further comprises:

a housing that is connected to the housing of the pressure sensor;

a fluid connector at a first end of the housing; and a bore extending through the fluid connector and fluidly coupled to the cavity between the pressure fitting and the pressure sensor.

16. The system of claim 15, wherein the bore extends through the fluid connector at an angle with respect to a central axis of the fluid connector.

17. The system of claim 14, wherein the pressure sensor chip further comprises:

a first diaphragm positioned at a top side of the pressure sensor chip laterally outwards from the second end of the channel.

18. The system of claim 14, wherein the channel is aligned with a null point of a primary resonance mode of the isolator.

19. The system of claim 14, wherein the baffle arrangement is configured to prevent a fluid from jetting onto the isolator.

20. The system of claim 14, wherein the baffle arrangement comprises:

a first screen having a plurality of openings positioned over the isolator; and a second screen having a plurality of openings positioned over the first screen;

wherein the plurality of openings of the first screen are offset from the plurality of openings of the second screen.

* * * * *